United States Patent

[11] 3,624,545

[72] Inventor Monte Ross
 Ladue, Mo.
[21] Appl. No. 769,836
[22] Filed Oct. 23, 1968
[45] Patented Nov. 30, 1971
[73] Assignee McDonnell Douglas Corporation
 St. Louis, Mo.

[54] SEMICONDUCTOR PUMPED LASER
 18 Claims, 5 Drawing Figs.

[52] U.S. Cl. .................................................. 331/94.5
[51] Int. Cl. .................................................. H01s 3/00
[50] Field of Search .................................... 331/94.5

[56] References Cited
 UNITED STATES PATENTS
 3,320,013 5/1967 Johnson ...................... 350/1
 3,284,722 11/1966 Gray ............................ 331/94.5

OTHER REFERENCES
Susaki et al., " Losing Action in Ga— Al As Diodes,"
IEEE T QER 6/68 pg. 422– 424

Primary Examiner—Ronald L. Wibert
Assistant Examiner—Conrad Clark
Attorney—Charles B. Harverstock ABSTRACT: A laser device employing laser means to pump laser means and including a main laser element constructed of materials such as yttrium aluminum garnet (YAG) that is capable of lasing and one or more semiconductor diodes capable of being stimulated to operate as lasers, said diodes being positioned to pump their outputs into the main laser element, said device requiring relatively little energy to produce a laser action.

LASER OUTPUT

3,624,545

SEMICONDUCTOR PUMPED LASER

The present invention relates generally to laser devices and more particularly to an improved laser device employing semiconductor laser pumping means.

Semiconductor lasers as well as lamp pumped YAG laser devices have been known and used heretofore. The known devices, however, have certain deficiencies and disadvantages which have limited their usefulness and made them unsuitable for many applications. For example, known semiconductor laser devices have relatively poor spectral width characteristics and poor beam width characteristics, they produce relatively low-peak power output, and they have relatively broad pulse characteristics all of which are undesirable for many purposes. Lamp pumped lasers also have other shortcomings including having relatively low-efficiency characteristics, they are unreliable, they are relatively large and bulky, and they are difficult to modulate particularly at the higher data rates. Also most known laser devices are constructed such that external modulation for high-pulse rates are required whereas the present device is capable of internally modulating the laser and therefore requires much less energy to operate. These and other disadvantages and shortcomings of known laser devices are overcome by the present semiconductor laser pumped laser device which is highly efficient and reliable, has relatively narrow bandwidth and short pulse characteristics, is capable of producing relatively high-peak power output, and is relatively small, compact and easily modulated even at relatively high-data rates. The present laser device therefore overcomes many of the disadvantages and shortcomings of known devices.

The present invention also teaches the construction and use of semiconductor laser devices as a means for pumping other laser devices such as YAG laser devices rather than pumping by means of more conventional light sources. This means that the pumped device or laser element in the present device can also act as an energy storage device for pulses received from many semiconductor laser devices and can collect these pulses and use the energy thus stored to emit relatively high-energy level output pulses. The present laser device is also able to accept input energy from almost any direction from the semiconductor pumping diodes or lasers and yet can limit its outputs to a very narrow solid angle beam of pulses which are even narrower than the energy produced by the individual semiconductor pumping means employed. In addition the spectral width of the outputs of the subject laser device is many times narrower than the spectral width of the outputs of the individual semiconductor laser pumping means employed thereby enabling the use of narrow band filters to achieve better system background discrimination.

It is therefore a principal object of the present invention to provide improved laser pumping means.

Another object is to provide semiconductor means including semiconductor diode lasers to pump a laser device such as a laser rod.

Another object is to modulate the output of a laser by modulating the input pump energy thereto.

Another object is to provide means for transmitting information on a laser beam by pulse positioning means.

Another object is to produce laser operation by employing semiconductor laser pumping means.

Another object is to minimize the amount of pump energy required to produce lasing in a laser device.

Another object is to increase the efficiency of laser devices.

Another object is to increase the reliability and peak-power output of laser devices.

Another object is to reduce the size and bulkiness of laser devices.

Another object is to provide a laser device capable of producing relatively narrow bandwidth outputs having relatively short pulse characteristics.

Another object is to provide relatively simple means for modulating the input pumping energy to a laser device even at relatively high-data rates.

Another object is to provide a laser device capable of temporarily collecting and storing energy produced by one or more semiconductor laser pumping devices and capable of producing as a result of said stored and collected inputs relatively large peak output impulses.

Another object is to provide a laser device capable of accepting energy from almost all directions and capable of concentrating the energy outputs produced thereby in a relatively narrow angular range.

Another object is to provide a laser device that can be used with narrow band filters and like devices to achieve better background discrimination.

Another object is to provide a laser device that has pulse to pulse repeatability in energy emitted.

Still another object is to provide a semiconductor laser pumped laser device that can be constructed using solid state or liquid laser means.

These and other objects and advantages of the present invention will become apparent after considering the following detailed specification which covers preferred embodiments of the present device in conjunction with the accompanying drawings, wherein.

Figure 4:
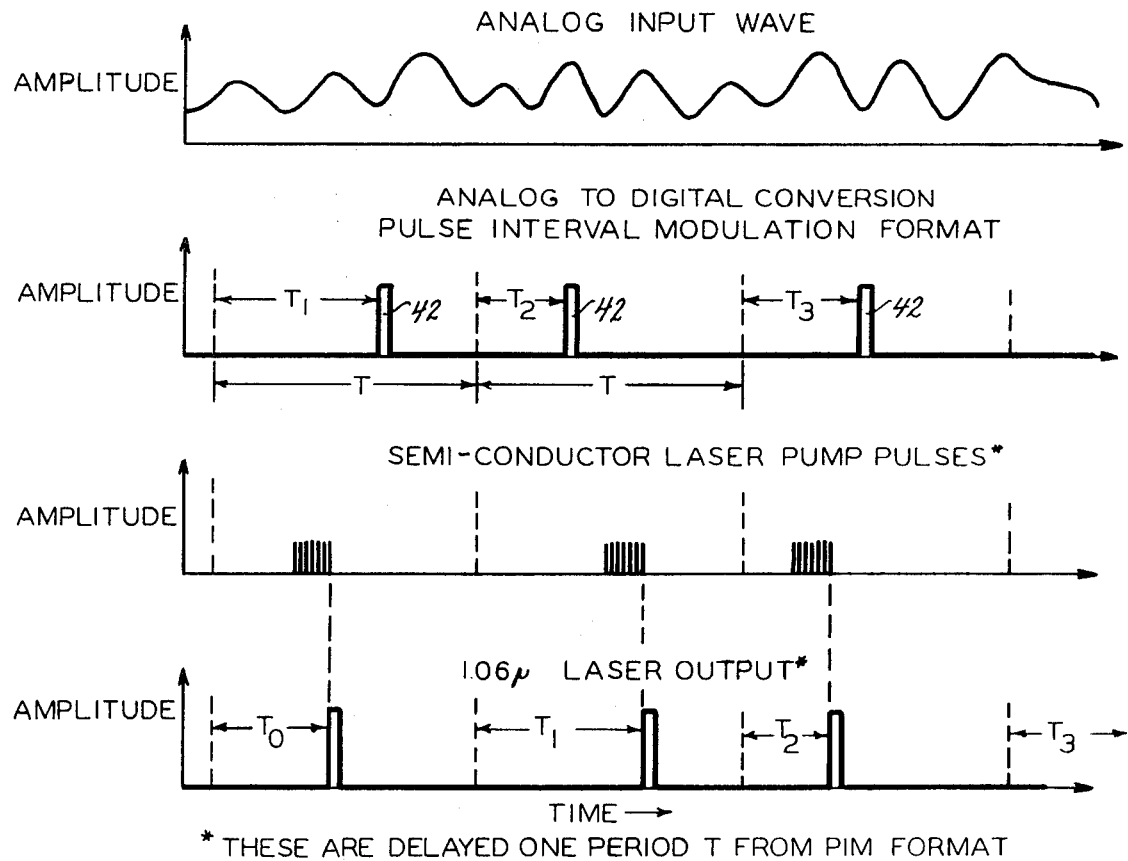
Figure 5:
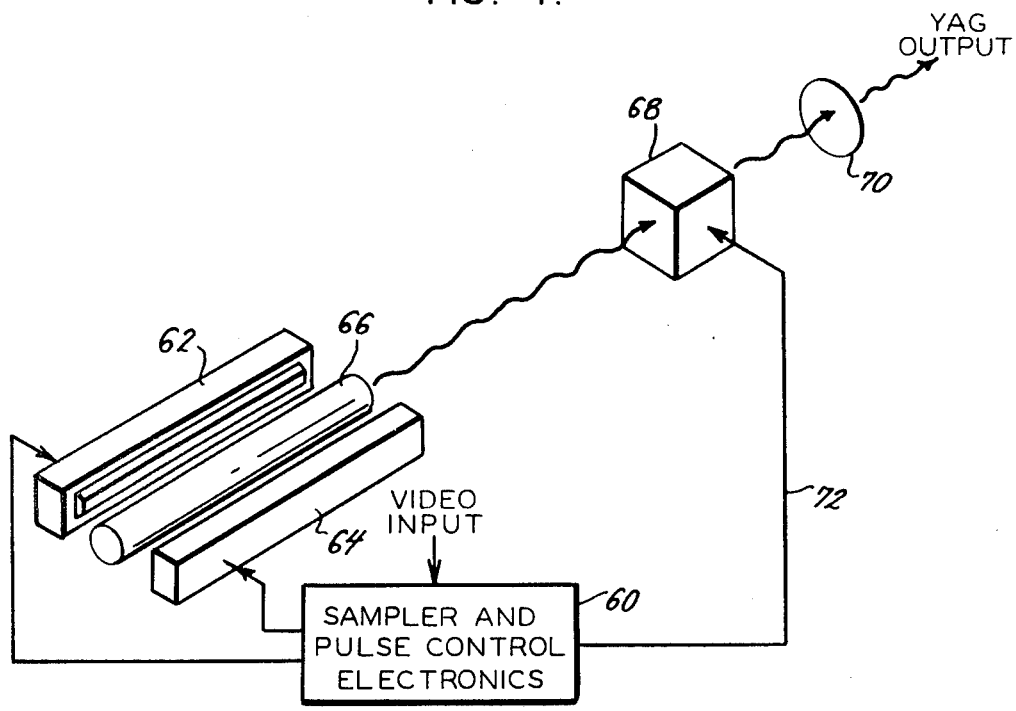

FIG. 4 graphically illustrates the time relationships between the various inputs and outputs of a semiconductor laser pumped laser device constructed according to the present invention; and, FIG. 5 is a schematic view partly in perspective showing another embodiment of a solid state laser transmitter incorporating the principles of the present invention.

Figure 1:
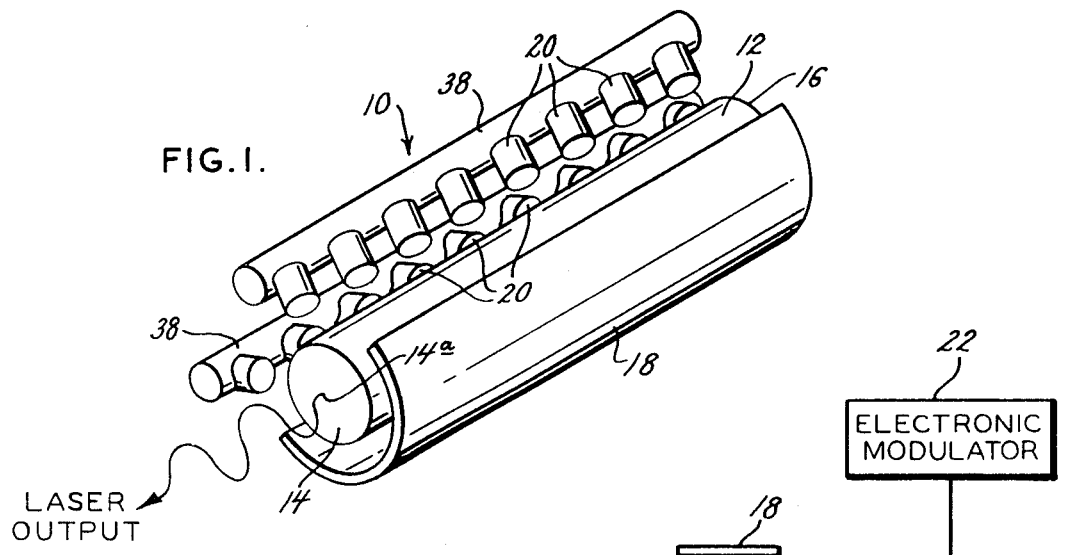
FIG. 1 is a simplified perspective view of a semiconductor laser pumped laser device constructed according to the present invention.

Referring to the drawings more particularly by reference numbers, number 10 in FIG. 1 refers generally to a laser device constructed according to the present invention. The device 10 includes a solid state laser rod 12 which is shown for illustrative purposes as being cylindrical in shape. The rod 12 in the preferred form of the present device is a yttrium aluminum garnet (YAG) rod which takes its name from the first letters of the three substances of which it is made, and the rod 12 may be doped with some substance such as neodymium. The rod 12 has a reflectively coated output end 14 from which output signals or pulses are emitted, and an opposite end 16 which is also coated or treated with some suitable highly reflective material. A curved reflector member 18 is positioned in spaced relationship to the rod 12 and extends all or part way along one or more sides of the laser rod 12 as shown. The reflector 18 is also constructed of some highly reflective material such as gold or silver. On the opposite side of the rod 12 from the reflector 18 are mounted one or more individual or arrays of semiconductor laser diodes 20. The diodes 20 are constructed of a material such as gallium arsenide or the like and are stimulated to lase and to serve as pump sources for pumping energy into the rod 12.

Figure 2:
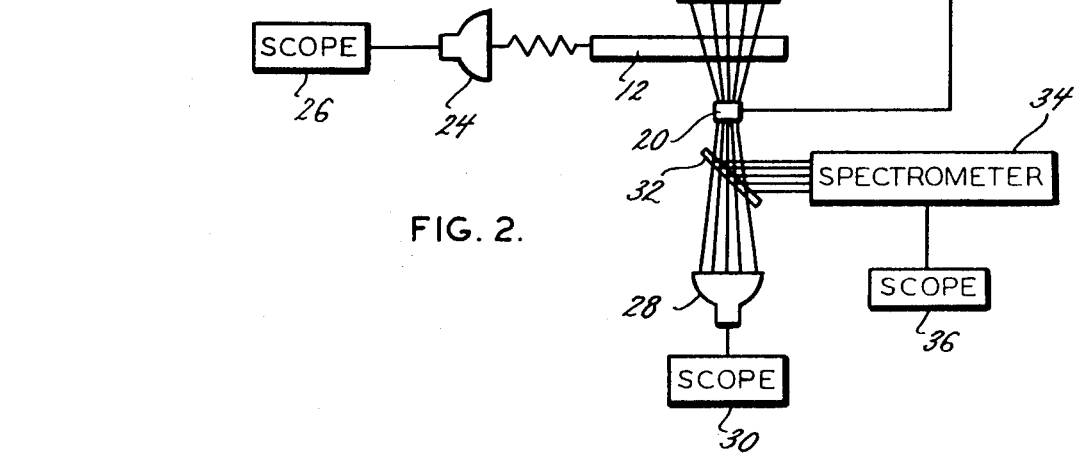
FIG. 2 is a schematic diagram partly in block form showing a simplified setup employing a single semiconductor laser pumped laser device constructed along the lines of the device shown in FIG. 1.

In the simplified form of the device of FIG. 2 a single laser diode 20 is shown positioned to pump energy into the laser rod 12. The form of the device shown in FIG. 2 is simplified to help in the understanding but it is anticipated that an actual device will usually have a plurality of semiconductor diodes similar to the diode 20 or a plurality of ganged together diodes as shown in the diode arrays in FIG. 1 to pump energy pulses into the rod 12 to cause it to lase.

In the device of FIG. 2 high-current output pulses from an electronic modulator circuit 22 are used to excite and drive the semiconductor diode 20 which then produces radiation outputs. The outputs of the diode 20 impinge on the rod 12 and are also reflected thereon in concentrated form by the reflector 18. The radiation outputs from the diode 20 are at a selected wavelength preferably one at which the YAG laser rod 12 has a substantial absorption band. This means that most of the radiation energy from the diode 20 that impinges on, or is reflected onto, the rod 12 will be temporarily stored therein. In an actual device this will usually include the outputs of more than one semiconductor diode laser as aforesaid, all of which laser diodes may be excited by the same electronic modulator means 22. In this way, efficient quantum transition takes place within the rod 12 whereby a photon of light entering at the proper semiconductor pump wavelength results in a photon being generated therefrom at the output wavelength of the rod. For the rod 12 to lase or produce a laser action a sufficient number of photons at the output wavelength of the laser must be generated and these must be generated within the fluorescent decay time of the laser rod which is one of the important characteristics thereof. It is possible with the present construction to pump the laser rod 12 with sufficient semiconductor energy from a plurality of the semiconductor diodes 20 for the required time period which corresponds to the decay time of the rod to generate pulsed laser output power.

One of the important distinguishing characteristics of the present device is that it can use one or more semiconductor diodes 20 which operate as lasers to pump energy into another laser element which in this case is the YAG laser member 12. This is to be distinguished from other laser devices which have pumps which are made broader in input light spectrum. Either lamps or nonlasing semiconductor pumps have emission spectrums which are much broader than a single absorption band of a neodymium doped YAG rod, for example. This excess spectrum has a deleterious effect on the laser device by excess heating creating thermal distortions and limiting repetitive rate, and in general, leading to overall lack of efficiency. By using laser means to pump laser means these deficiencies are overcome. This is important to the construction and operation of the present device.

There are several important and beneficial reasons for going through the intermediate step of using semiconductor laser devices or diodes to pump a laser device such as the laser rod 12. These include, among other things, the fact that a laser device such as the YAG laser rod 12 is able to act as an energy storage device so that the input pump pulses it receives from the associated semiconductor laser elements 20 can be collected and temporarily stored therein and thereafter emitted at a much higher energy level. Also the YAG laser rod 12 acts as an energy director in that it is able to accept energy from the laser diodes 20 from almost any direction while at the same time it is able to limit its output to a relatively narrow, nearly solid angle beam which in an actual device may be $10^4$ times or more narrower than the output beam radiations generated by the individual semiconductor laser diodes themselves. In other words, the YAG laser element or rod in the present device acts as an energy concentrating means. Furthermore, the spectral width of output of the YAG laser member 12 is many times narrower than the spectral width of the individual semiconductor laser diodes, thus enabling the use of narrow band filters to achieve better system background discrimination. In an actual device, for example, the spectral width of the outputs produced by a YAG laser member is less than 1 Angstrom as compared to a spectral width of approximately 20 Angstroms for the outputs of the individual semiconductor laser diodes employed. Hence the present device particularly when compared to semiconductor lasers not only provides means for narrowing the cross-sectional dimensions of the output beam or output pulses of a laser device but it also substantially narrows the spectral width of the energy in the outputs.

The use of semiconductor laser pumping means for exciting another laser device also minimizes losses as is readily apparent from what has just been said, and from the further fact that semiconductor lasers have inherently high electrical to optical power conversion efficiency. This means that the spectral match which exists between the pump radiation energy and the absorption characteristics of the YAG laser element minimizes losses in converting input electrical energy into narrow, high-power pulsed laser outputs. Heat losses in the subject laser are also at a minimum thereby permitting relatively high-power operation of the subject laser to be achieved. Still further, by selectively pumping an energy level that is as close as possible to the laser radiation energy level, radiationless transitions which are essentially heat losses within the YAG laser member 12 or other crystal host material are minimized. It is therefore possible with the present construction to relatively accurately electronically control or stimulate semiconductor pump laser elements which in turn provides more accurate control of the output of the laser. The all solid state construction of the present device has the further advantages of also effectively increasing the overall reliability of the subject device while at the same time reducing its size and eliminating the need for more conventional light pump sources together with their associated relatively high voltage and power requirements.

The relatively high-spectral purity obtained in the laser output of the present device is due in large measure to the selective spectral pumping employed since with such pumping the pump energy is concentrated in an absorption band from which the radiation transition occurs. The achievement of long term mode purity is therefore enhanced in the present device by the fact that the entire unit can be maintained at an easily controlled temperature especially since the heat losses in the laser cavity are minimized by the selective spectral pumping as described.

One form of the semiconductor material that has been successfully used in the construction of the pumping laser diodes 20 is gallium arsenide, and in the same device the YAG laser rod was formed of a nyodymium doped YAG lasing material. With this combination efficient transitions occur in the laser rod 12 when the pump energy is centered in a spectral band at approximately 8685 Angstroms. Since gallium arsenide at room temperatures radiates at a wavelength of approximately 9050 Angstroms, it is necessary therefore to cool the diodes to a temperature of approximately 170° Kelvin to center the spectral radiation of the diode pump elements at the frequency of 8685 Angstroms which is the desired absorption band of the YAG rod. This is because the radiation spectrum for gallium arsenide shifts at a rate of approximately 3 Angstroms per degree Kelvin.

The spectral band over which efficient energy conversion takes place in the present device is relatively narrow and for this reason it is also important to restrict the temperature excursions of the gallium arsenide pump laser elements 20 due to internal heating. By proper choice of the pulse-modulating waveforms it is possible to reduce the temperature excursions and the accompanying spectral shift effect thereby preventing the gallium arsenide emission from shifting outside the most efficient absorption band of the main YAG laser member 12.

In an actual test of a device constructed according to the present invention an effort was made to produce as much useful pump energy from the laser diodes 20 as possible. The laser diodes tested were gallium arsenide laser elements having a peak power capability of approximately 50 watts for a driving current of approximately 270 amperes. This test device produced an average energy output in the range of approximately 100 millijoules. It was also discovered that a single gallium arsenide laser pump element or diode pumping a 1.5 millimeter diameter YAG rod approximately 30 millimeters long is able to produce a lasing condition in the rod. The output of such a device can be monitored using photodiodes such as the photodiode 24 in FIG. 2 and the output can be displayed on an oscilloscope such as on cathode-ray scope 26. The output produced on the scope 26 in an actual test device turned out to be a relatively well-defined waveform having clearly defined peaks and valleys. The device of FIG. 2 is also shown having another photodiode sensor 28 positioned to directly monitor the radiation output of the semiconductor laser diode 20. These outputs have much less well defined and pronounced power peaks and much broader spectral characteristics. The output of the photodiode 28 is shown in FIG. 2 feeding another monitoring device or scope 30.

A mirror device 32 is also shown in FIG. 2 positioned to intercept and reflect radiations received from the diode 20. The mirror 32 reflects the output radiations it intercepts and redirects them to an optional spectrometer device 34 which is constructed to feed another optional monitoring device 36. The optional spectrometer device 34 and monitor device 36 are included to provide means by which it is possible to determine the spectrum and spectral range of the outputs produced by the semiconductor laser diode 20. It should be recognized, however, that any number of laser diodes 20 can be provided to drive a single YAG laser member 12 as aforesaid and all or each such diode can be monitored separately on in groups as desired. It is also to be noted that the electronic modulator means can be used to stimulate or modulate one or a plurality of the semiconductor laser diodes 20 by having its output fed to each diode or to one or more diodes optically coupled together by means such as the coupling members 38 shown in FIG. 1.

In the particular embodiment of the present device as disclosed, the spectral width of the output radiation or radiation pulses of the YAG laser rod 12 when stimulated or pumped is relatively narrow as aforesaid being in the range of 0.3 Angstroms or less. The spectral shift of the gallium arsenide laser pump elements under the same conditions and during pulse operation was approximately 25 Angstroms at the half-power point of the device. This will provide some indication as to how the energy output produced by the present device is concentrated relative to the energy input.

The electronic modulator means 22 for the subject device should be constructed with care taking into account the fast rate of change and the high level of current required to modulate the gallium arsenide laser diodes. Stray inductance should also be minimized in the circuits. Furthermore, because of the inherently low resistance of the pump diodes 20 which is of the order of magnitude of approximately 0.01 ohms, series rather than parallel operation of the pump elements is usually preferred to effectively increase the efficiency of the conversion from the electrical input driving power to the optical pump output power. The construction of the modulation means is therefore important to the present device and is critical in the cases of diodes constructed of gallium arsenide, aluminum gallium arsenide, and gallium arsenide phosphide. The importance of the modulator means to the efficient operation and to enable the use of the efficient absorption bands requires diode temperatures above approximately 150° Kelvin. Furthermore, to avoid excessive spectral shift of the diode output spectrum, short pulse modulation is usually preferred if not required, and continuous operation of the diode pumping means as distinguished from pulsed operation or modulation thereof will usually not result in producing lasing conditions.

Figure 3:
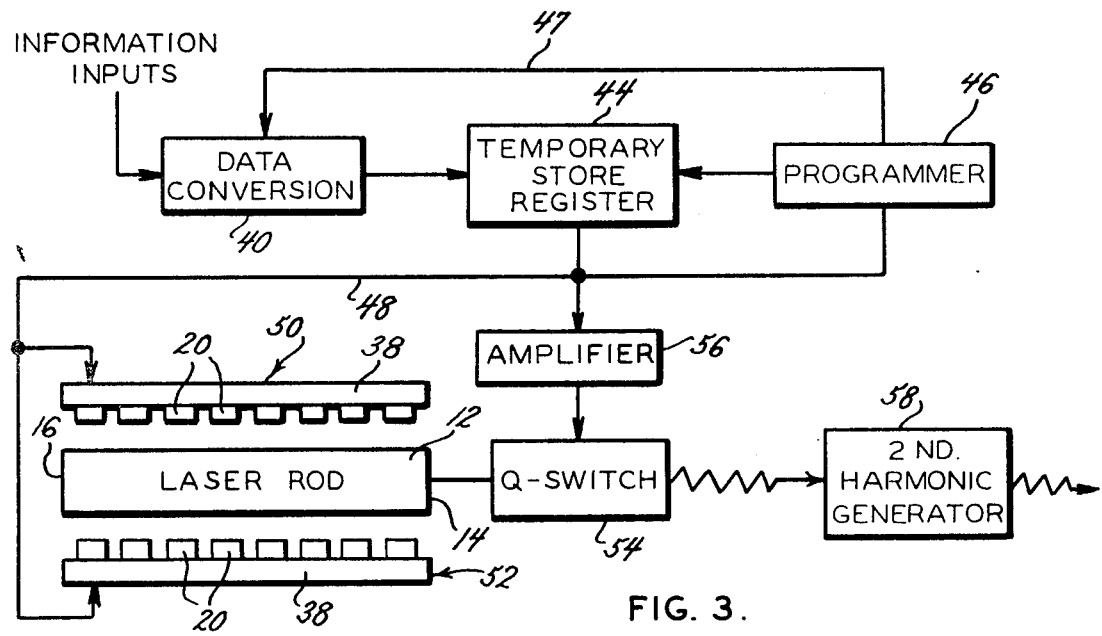
FIG. 3 shows communication transmitter means employing a laser device constructed according to the present invention.

FIG. 3 shows one form of electronic modulation means for use in stimulating the semiconductor laser elements 20 employed in the present device. In the form shown, information inputs which may be analog inputs (top graph in FIG. 4) are fed to a data conversion circuit 40. The circuit 40 converts these inputs to outputs which include a plurality of spaced pulses 42 (second graph of FIG. 4). In other words, the conversion circuit 40 converts the input from analog to digital form and thereafter from digital to pulse form. The output of the data conversion circuit 40 is fed as the input to a temporary storage register 44 which in turn is controlled and programmed by a programming circuit 46. The programming circuit 46 also produces feedback energy on lead 47 to the data conversion circuit 40 to maintain a proper time relationship between the circuits 40 and 44.

The outputs of the temporary storage register 44 are also controlled by the programming circuit 46, and the outputs of the circuits 44 and 46 which appear on lead 48 are used to stimulate or excite the arrays 50 and 52 of semiconductor laser pump diodes 20 to cause them to lase and produce radiation outputs for applying to the YAG laser rod 12 in the manner already described. In this way, the laser rod 12 is pumped by the output radiation energy of the semiconductor laser elements or diodes 20 to produce the necessary lasing condition therein. The outputs of the rod 12 are available at an opening 14a in the reflective coating formed on the output end 14 thereof or as is common in laser devices a separate output mirror can be used. These outputs are shown in FIG. 3 being fed or applied to the input side of a Q-switch 54 which is controlled and/or modulated by the output of an amplifier circuit 56. The circuit 56 in turn is connected to and controlled by the same outputs of the temporary storage register 44 and the programmer circuit 46 that are used to excite the laser diodes. The output side of the Q-switch 54 is also shown for illustrative purposes feeding a second harmonic generator device 58 which is constructed to select the desired final output which is shown as the second harmonic of the output of the laser rod. In the drawing the output of the laser rod 12 is shown having a wavelength equal to 1.06 micrometers, and the output of the second harmonic generator 58 is shown having a wavelength equal half of this or 0.53 micrometer.

Referring again to FIG. 4 it can be seen that the pulses applied to the semiconductor laser pump elements 20 include a plurality of pulse groups. These pulse groups are temporarily stored in the temporary storage means 44 and in the YAG laser rod an output is produced by the rod whenever a predetermined number of inputs have been stored under control of the programming circuit 46. The form and time relationship of the semiconductor laser pump pulses are shown on the third graph of FIG. 4, and the 1.06 micrometer outputs produced by the laser rod 12 are shown by the bottom graph. For illustrative purposes the pulses in the fourth or bottom graph are shown spaced to occur only after a predetermined number of pulses or stimulations are received by the rod 12 from the outputs of laser pump diodes 20. Also in the graphs of FIG. 4 the outputs of the semiconductor laser pumps 20 and the outputs from the laser rod 12 are shown delayed by one time period T-relative to the corresponding outputs of the temporary storage register 44 for illustrative purposes.

While the overall efficiency of the present device is relatively high as already stated it is anticipated that certain losses will occur in the power supply, the pulse modulator means, the semiconductor lasers and the YAG laser rod. There will also be some loss in the laser rod itself due to the absorption-efficiency characteristics thereof. Even considering these losses, however, the overall efficiency is much higher than the efficiency of any known YAG laser devices operated using lamp or nonlasing diode pumping means instead.

FIG. 5 shows another embodiment of the subject device which includes the same basic structural details of semiconductor laser pump means and the YAG laser rod as in the forms disclosed above. In the device of FIG. 5 the semiconductor laser pumps are stimulated by video signals which are applied through circuit 60 which has its input connected to receive video inputs, and outputs connected to the various individual or banks 62 or 64 of semiconductor laser pumps. This circuit in the modified construction is labeled "Sampler and Pulse control Electronics Circuit" and may be similar or analogous to the temporary storage register 44 and the programmer circuit 46 described above.

In the modified construction the outputs of the YAG laser rod 66 are fed to an electro-optical crystal device or modulator 68 which may be a Q-switch, and the outputs of the modulator 68 are fed to a laser cavity output mirror 70 which operates to further modulate the laser outputs to produce outputs at the desired frequency and that have the other desired characteristics. The modified form of the subject device has many possible uses and application including transmitting video and other types of information. The crystal modulator device 68 is also connected for control purposes to a control output of the circuit 60 by lead 72.

Thus there has been shown and described several embodiments of a novel laser device including novel means for stimulating one laser device with other laser means including particularly semiconductor laser means which fulfill all of the objects and advantages sought therefor. Many changes, modifications, alterations, and other uses and applications of the present device will, however, become apparent to those skilled in the art after considering this specification and the accompanying drawings. All such changes, modifications, alterations, and other uses and applications which do not depart from the spirit and scope of the invention are deemed to be covered by the invention which is limited only by the claims which follow.

What is claimed is:

1. A laser device comprising a rod-shaped YAG laser member constructed of a material capable of lasing when pumped by energy, said YAG laser rod having spaced reflective end surfaces one of which has an aperture therethrough for emitting the output energy, and means for pumping energy into the YAG laser rod to cause it to lase, said pump means including at least one semiconductor diode laser element capable of being operated as a laser over a wide range of temperatures including temperatures above about 170° Kelvin, and means including electronic pulse modulator means operating in a pulse burst mode operatively connected to said diode laser to excite said diode laser to produce a pulse burst lasing condition therein, said diode laser being positioned to produce an output which is directed toward the aforesaid YAG laser rod to excite said rod to produce a YAG lasing condition therein.

2. The laser device defined in claim 1 wherein said electronic modulator means includes a source of excitation impulses.

3. The laser device defined in claim 1 wherein a plurality of similar semiconductor diode lasers are mounted adjacent to the laser rod, said electronic modulator means including means operatively connected to excite each of said plurality of diode lasers to produce a lasing condition therein, all of said diode lasers being positioned to produce outputs directed toward the laser rod.

4. The laser device defined in claim 1 including means for reflecting and focusing portions of the output of the diode laser toward the laser rod.

5. The laser device defined in claim 1 wherein said semiconductor diode laser includes a plurality of similar semiconductor diode laser elements and means connecting said elements into an integral structure, said electronic modulator means being operatively connected to the diode connecting means to simultaneously excite all of said connected together semiconductor diode laser elements, all of the connected diode laser elements being positioned to produce laser outputs that are directed toward the laser rod.

6. A laser device comprising a main laser element including a rod constructed of a YAG laser material capable of lasing when properly excited, and means for exciting said YAG laser rod including a diode laser constructed of semiconductor materials positioned adjacent to said rod, said diode laser being operable over a wide range of temperature conditions including at temperatures above about 170° Kelvin, means including pulsed modulator means operating in a pulse burst mode operatively connected to said diode laser to excite said diode laser to produce a lasing condition therein, said diode laser being positioned to produce a pulsed laser output which is directed at the laser rod, said YAG laser rod having the further characteristic of being able to store outputs received from the diode laser until sufficient energy has been accumulated to cause the YAG laser rod to lase.

7. The laser device defined in claim 6 wherein said pulsed modulator means includes a pulse generator capable of stimulating the semiconductor diode laser to cause said diode laser to lase and to produce periodic bursts of laser output impulses.

8. The laser device defined in claim 6 wherein said laser rod is constructed of neodymium doped YAG material.

9. The laser device defined in claim 6 wherein said semiconductor diode laser is constructed of gallium arsenide.

10. The laser device defined in claim 6 wherein said semiconductor diode laser is constructed of aluminum gallium arsenide.

11. The laser device defined in claim 6 wherein said semiconductor diode laser is constructed of gallium arsenide phosphide.

12. The laser device defined in claim 6 wherein a plurality of similar diode lasers are mounted adjacent to the laser rod, said pulsed modulator means including means operatively connected to excite each of said plurality of diode lasers to produce a pulse burst lasing condition therein, all of said diode lasers being positioned to produce outputs directed toward said rod.

13. The laser device defined in claim 6 including means for reflecting and focusing portions of the output of the diode laser toward the laser rod.

14. The laser device defined in claim 6 wherein said semiconductor diode laser includes a plurality of similar semiconductor diode laser elements, and means connecting said elements into an integral structure, said pulsed modulator means being operatively connected to the diode laser connecting means to simultaneously excite all of said connected together diode laser elements, all of said connected diode laser elements being positioned to produce laser outputs that are directed toward the laser rod.

15. A laser device comprising a member constructed of an ionic element dopant in a host material characterized by having a substantial absorption band at a predetermined frequency or frequencies, said member having opposite end surfaces and means associated with each of said end surfaces of said member forming a reflective surface, one of said reflective surfaces having means associated therewith from which energy produced when said member lases is emitted, and means for pumping energy into said member to cause said member to lase, said pump means including a semiconductor diode element constructed of a material capable of lasing when excited, said semiconductor diode being operable over a wide range of temperatures including temperatures above about 170° Kelvin and having an output end oriented to direct outputs produced therein when it lases toward the aforesaid laser member, and means including pulse modulator means operable in a pulse burst mode operatively connected to said laser diode to excite said diode to produce a pulsed lasing condition therein and pulsed laser output radiations therefrom which are directed toward the aforesaid laser member, the substantial absorption band characteristic of said laser member enabling said member to temporarily store radiation energy impinging thereon form the laser diode until sufficient energy is stored to cause said member to lase and to radiate a laser output, 16. The laser device defined in claim 15 including means positioned to intercept some of the output radiation energy of the laser diode and for reflecting said radiations in a focused condition onto the laser member.

17. The laser device defined in claim 15 wherein a plurality of similar laser diode elements are connected together in an array, the spectral match between the radiation output energy of said diode elements and the absorption characteristics of the said laser member being selected to minimize losses in converting the pulsed energy produced by the pulse modulator means into laser output radiations from said laser member.

18. The laser device defined in claim 15 including means to maintain the laser diode element at a predetermined temperature to spectrally match the output radiations thereof to the spectral absorption characteristics of the laser member.

* * * * *